A. A. & J. J. ANTHONY.
CENTERING MACHINE.
APPLICATION FILED JULY 3, 1906.
945,256.
Patented Jan. 4, 1910.
3 SHEETS—SHEET 1.
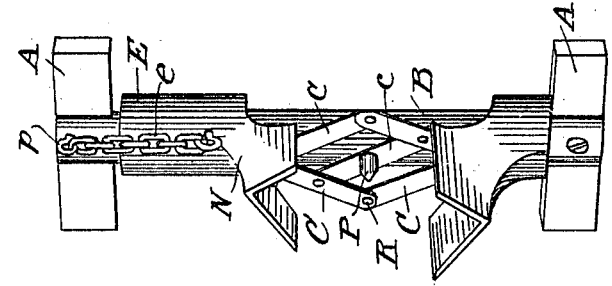
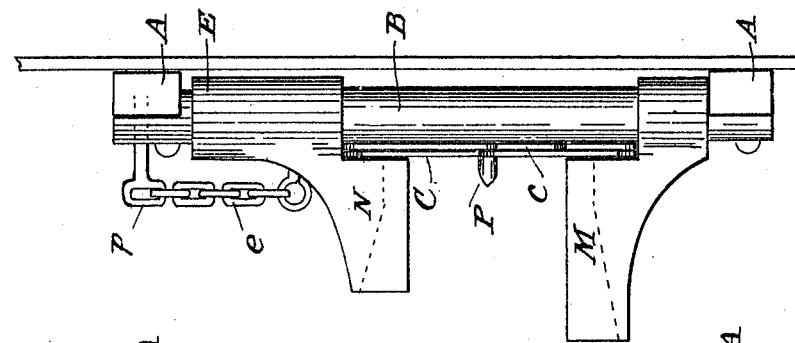
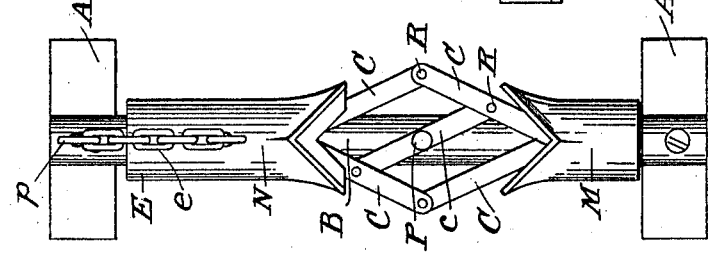
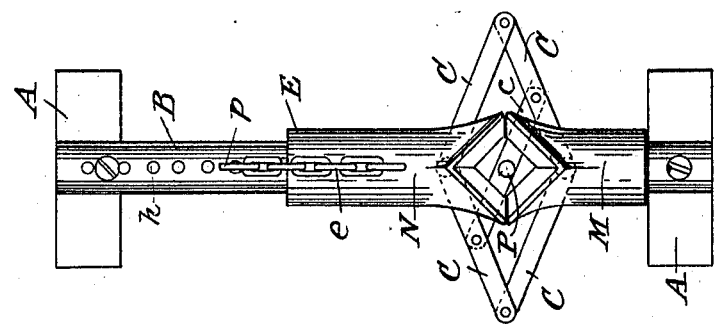
Witnesses
Inventors.

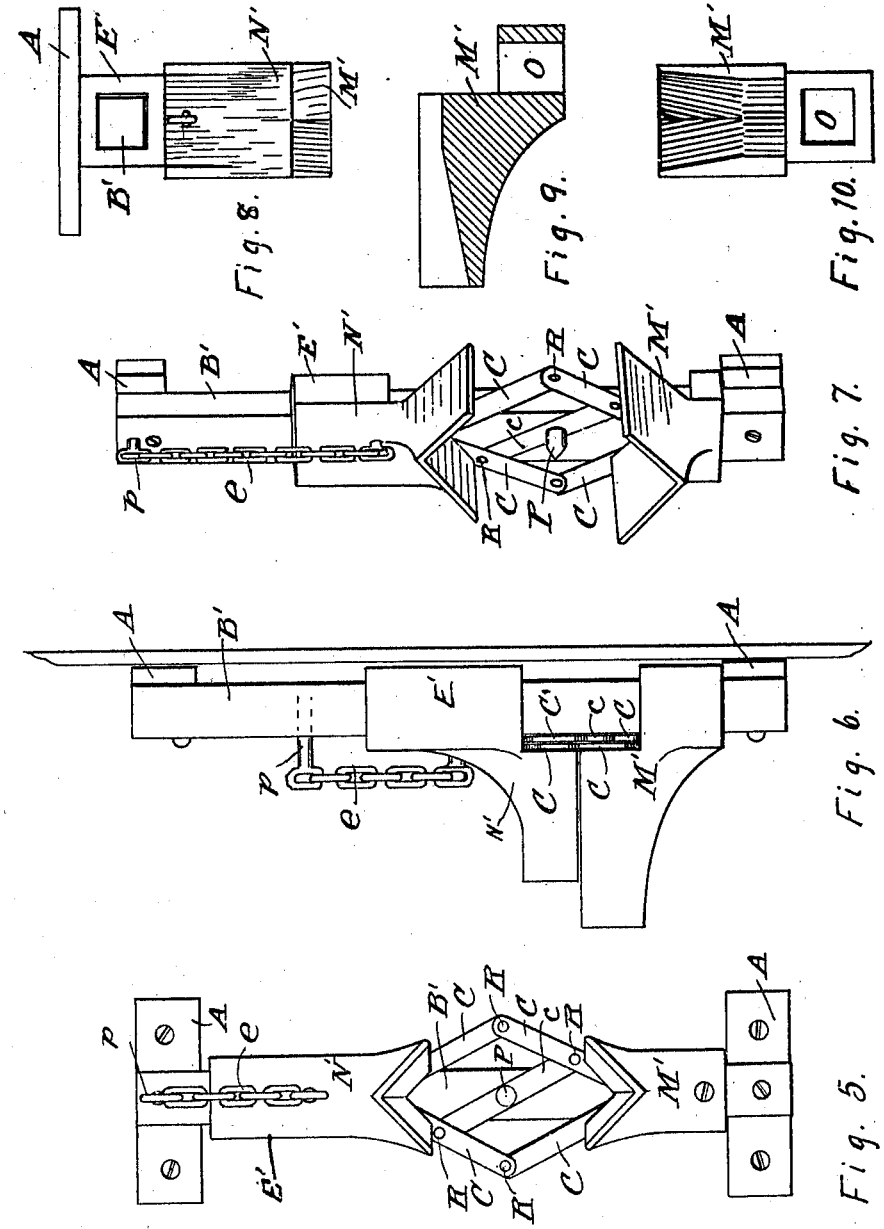

A. A. & J. J. ANTHONY.
CENTERING MACHINE.
APPLICATION FILED JULY 3, 1906.
945,256.
Patented Jan. 4, 1910.
3 SHEETS—SHEET 3.
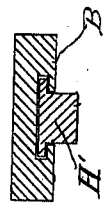
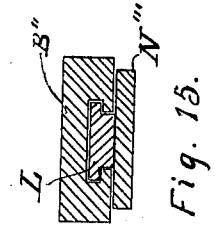
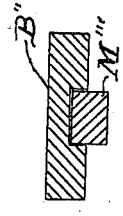
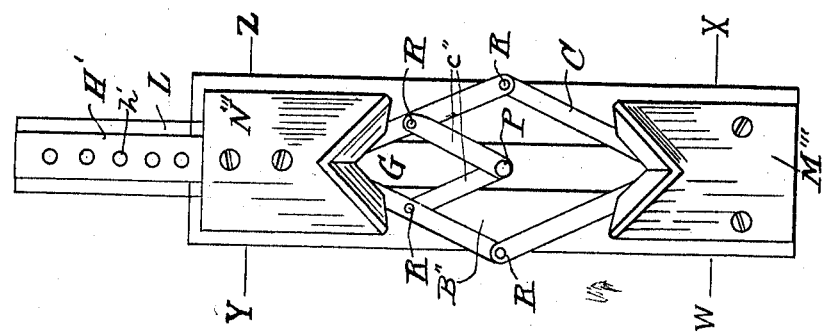
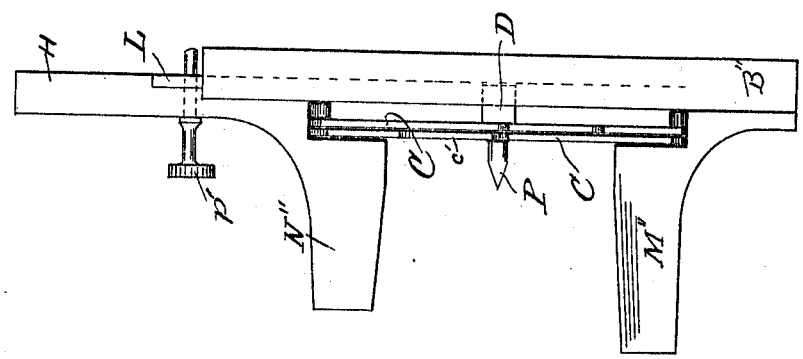
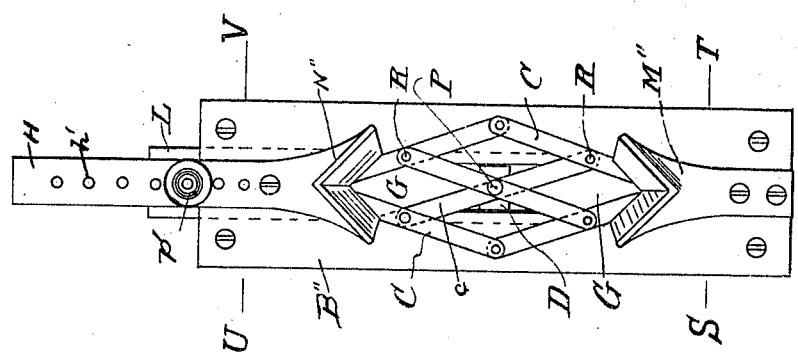
Witnesses:
Inventors.

UNITED STATES PATENT OFFICE.

ALBERT A. ANTHONY, OF BEND, OREGON, AND JOHN J. ANTHONY, OF MOSCOW, IDAHO.

CENTERING-MACHINE.

945,256. Specification of Letters Patent. Patented Jan. 4, 1910.

Application filed July 3, 1906. Serial No. 324,664.

*To all whom it may concern:*

Be it known that we, ALBERT A. ANTHONY and JOHN J. ANTHONY, citizens of the United States, and residents, respectively, of Bend, in the county of Crook and State of Oregon, and of Moscow, in the county of Latah and State of Idaho, have invented a new and useful Improvement in Centering-Machines, of which the following is a full, clear, and accurate description.

The object of our invention is to provide a new and improved centering machine which shall be simple, rapid and accurate, and so far as practicable self adjusting, and one whereby the centers of timbers and bars of different sizes and forms of cross section may be readily and certainly obtained, and with a minimum expenditure of time and effort.

How we obtain our object will be readily understood from an inspection of the drawings accompanying these specifications and which are to constitute a part thereof and wherein similar characters of reference indicate corresponding parts in all the views. Of these drawings there are three sheets, of which the figures of Sheet 1 represent our invention as it appears with the centering jaws mounted on a cylindrical guide bar; those of Sheet 2 as it appears with the jaws mounted on a rectangular guide bar; those of Sheet 3 as it appears with the jaws mounted on a grooved guide bar, or guide plate, those of Sheet 2 being a slight modification and those of Sheet 3 a pronounced modification of those of Sheet 1.

Figure 1. represents a front view when the jaws are closed. Fig. 2., Fig. 5., Fig. 11. and Fig. 13. represent front views when the jaws are open. Fig. 3 and Fig. 12. represent side views when the jaws are open. Fig. 6. represents a side view when the jaws are closed. Fig. 4 and Fig. 7. are perspective views. Fig. 8. is a plan view from above. Fig. 9. is a vertical longitudinal section through the lower jaw. Fig. 10. is a plan view of the upper face of the lower jaw. Fig. 14. is a horizontal cross section through U V of Fig. 11. Fig. 15. is a similar section through Y Z of Fig. 13. Fig. 16. is a similar section through S T of Fig. 11.

A fuller understanding may be had from the following complete and detailed description.

M and N are a pair of centering jaws with V-shaped faces and mounted on a vertical guide bar B. The lower jaw is stationary and preferably firmly secured to said guide bar. The upper jaw is made to slide on the guide bar and is provided with a collar E encircling the same. The outer or front ends of the jaws will have their V-shaped faces further sloped to a considerable degree to permit the piece that is to be centered to enter the more readily and to exercise a wedging action upon the jaws whereby they will be forced apart until the entering piece can be thrust against the punch P which marks the center. These jaws are further pivoted at their rear ends to a pair of the opposite angles of a collapsible rhombus formed of four flat bars or carriers C of equal length pivoted together at their ends so as to move freely on the rivets R and bearing a fifth bar or center carrier $c$ of equal length pivoted at its ends to the middle points of a pair of opposite sides of said rhombus. At the center of said center carrier and midway between said jaws is mounted a center punch P which if the machine be properly constructed will maintain a position midway between the angles or V's of said jaws at all times regardless of their position.

A series of adjusting holes $h$ in the guide bar B and an adjusting pin $p$ for insertion therein are provided for the purpose of preliminary or partial adjustment of the slidable jaw N, for with the wide range of work contemplated it will be impracticable to give sufficient flare to the jaws to accommodate all the different sizes of material that may be presented. It is therefore expedient to provide limits between which the jaws may be self adjusting, which is the object of the adjusting pin and its accompaniment of adjusting holes. These adjusting holes are supposed to be so numbered as to show at what position of limits the jaws are set, which numbering has not been made to appear on the drawing since it does not form an essential feature of our invention, although it is our intention to employ it and we claim the privilege of so doing. The adjusting pin $p$ is attached to one end of a small chain $e$ secured at its other end to the slidable jaw N which is thereby supported in its proper position of limits while awaiting the entrance of the piece to be centered. If, however, the modified form wherein the grooved guide bar is employed, as shown in the figures of Sheet 3, be made use of the chain will not be essential and if employed at all its purpose will be to prevent the loss of the adjusting pin, and for this purpose it will preferably be attached to a stationary part of the machine. And the adjusting holes will not be located in the grooved guide bar but in an extension H of the upper jaw N'', as shown in Fig. 11, or in the upper end of an adjusting bar H' to which the jaw N''' may be secured, as shown in Fig. 13. In either case the pin will be long enough to project over the guide bar, upon which it will rest while awaiting the entrance of the work to be centered. Also, when this modified form wherein the grooved guide bar is used is employed, said guide groove will be preferably of T-shaped cross section (but it may be of L-shaped cross section) and the slidable jaw N'' instead of being provided with a collar encircling the guide bar will be provided with a T-shaped (or an L-shaped) lip L engaging with said guide groove, as shown in figures of Sheet 3. Or said jaw may be secured to an adjusting bar H' in engagement with said guide groove, as shown in Fig. 13.

Instead of a single center carrier c, as shown in the drawings of Sheet 1 and Sheet 2, a similar pair of intersecting carriers c' may be used, the punch being mounted at their common center, as shown in Fig. 11. Or a pair of half length carriers c'', as shown in Fig. 13, may be used, their intersecting ends being pivoted on the punch, their other ends pivoted on the centers of a pair of adjacent sides of the collapsible rhombus. And further, when the form employing the grooved guide bar is used, a thrust block D, as shown in Fig. 11, will be provided to play in the guide groove and receive the force of the thrust of the entering piece to be centered, the object being to prevent the distortion of the center carrier and the consequent throwing of the punch out of alinement, said thrust block to be secured to the center punch when a pair of center carriers is employed, or to the carrier or the punch either (or to both) when a single carrier is employed, which latter method will probably be the usual practice. However, when the slidable jaw N''' is mounted on the adjusting bar H', as in Fig. 13, no thrust block will be necessary, inasmuch as said adjusting bar is supposed to extend below said jaw far enough to at all times maintain a position behind the center punch and so perform all the functions of the thrust block.

When the form of the machine is that shown in the drawings of Sheet 1 or Sheet 2 no thrust block will be necessary, inasmuch as the punch is supposed to play close to the guide bar which will be able to perform the duties of the thrust block. But the block may be used in all the types of the invention.

The manner of operation of our machine is as follows: When the material to be centered is ready the upper jaw is raised or lowered, as the case may be, to a position corresponding to the desired limits and the adjusting pin inserted in the proper hole to maintain it in that position. The end of the piece to be marked is then thrust (with one of its diagonals in a vertical position if it be not a cylindrical body) between the outer ends of the jaws and forced back spreading the jaws until it strikes the punch which marks the center. When centering light material it will not as a rule be necessary to make the preliminary adjustment just described. The jaws being usually left in a position of narrow limits all that is necessary is to catch the upper corner of the timber (which is easily done by raising its outer end a little above the horizontal) just under the outer edge of the upper jaw and giving it a light lift followed by a forward thrust which will cause the jaws to expand and permit the piece to strike the punch, the object to be attained. This condition presupposes that the jaws are of equal length, and the operation would be facilitated by making the upper jaw somewhat longer than the lower one, whereas in our drawings we have chosen to make the lower jaw the longer as would be best when handling heavy timbers. The length of the jaws however forms no particular feature of our invention and we would contend for the privilege of using that particular length which we found best adapted to the particular class of work to be performed.

Having fully explained our invention and its mode of operation we claim the following as new and patentable and pray that Letters Patent be granted us thereon:

1. In a centering machine, the combination of a guide bar, radially separable jaws mounted on said guide bar, V-shaped opposing faces to said jaws, a collapsible rhombus pivoted on said jaws, a center carrier mounted on said rhombus, a center punch mounted on said carrier and at the center of said rhombus, a thrust block for said punch slidable on said guide bar and connected to the center carrier, and suitable means for securing said guide bar, substantially as shown and described.

2. In a centering machine, a guide bar, a stationary and a slidable jaw mounted thereon, V-shaped and opposing faces to said jaws, a chain secured to said slidable jaw, an adjusting pin attached to said chain, holes in said guide bar for the insertion of said pin, a center punch and means connected with the punch and said jaws to maintain said punch centrally between the jaws, as shown and described.

3. In a centering machine, a support, a pair of radially separable centering jaws thereon, said jaws having outward flaring V-shaped faces, a centering punch, a carrier therefor connected with said jaws and constructed and arranged to maintain said punch centrally between the jaws, as shown and described.

ALBERT A. ANTHONY.
JOHN J. ANTHONY.

Witnesses:
CHAS. L. GRITMAN,
C. L. THOMPSON.